（12）United States Patent
Terada et al.

(10) Patent No.: US 8,937,250 B2
(45) Date of Patent: Jan. 20, 2015

(54) WIRING HARNESS GUIDING APPARATUS

(75) Inventors: Tomoyasu Terada, Kosai (JP); Tsukasa Sekino, Kosai (JP); Shinji Kato, Kosai (JP)

(73) Assignee: Yazaki Corporation, Tokyo (JP)

( * ) Notice: Subject to any disclaimer, the term of this patent is extended or adjusted under 35 U.S.C. 154(b) by 210 days.

(21) Appl. No.: 13/394,399

(22) PCT Filed: Aug. 25, 2010

(86) PCT No.: PCT/JP2010/064344
§ 371 (c)(1),
(2), (4) Date: Mar. 6, 2012

(87) PCT Pub. No.: WO2011/030667
PCT Pub. Date: Mar. 17, 2011

(65) Prior Publication Data
US 2012/0162959 A1    Jun. 28, 2012

(30) Foreign Application Priority Data

Sep. 11, 2009    (JP) .................................. 2009-210634

(51) Int. Cl.
*H01B 7/00*    (2006.01)
*H02G 3/04*    (2006.01)
(Continued)

(52) U.S. Cl.
CPC .......... *B60R 16/0215* (2013.01); *B60N 2/0715* (2013.01); *B60N 2/0722* (2013.01); *B60R 16/027* (2013.01); *B60N 2002/0264* (2013.01)
USPC ..................................... 174/72 A; 296/65.13

(58) Field of Classification Search
USPC ............................................. 361/826, 65.13
See application file for complete search history.

(56) References Cited

U.S. PATENT DOCUMENTS 4,830,422 A * 5/1989 Levitre ........................ 296/65.03
5,676,341 A * 10/1997 Tarusawa et al. ............. 248/430
(Continued)

FOREIGN PATENT DOCUMENTS

JP    2005-313662 A    11/2005
JP    2006-042457 A    2/2006
(Continued)

OTHER PUBLICATIONS

Supplementary European Search Report dated Apr. 4, 2013, issued for the European patent application No. 10815264.6.
(Continued)

*Primary Examiner* — Hoa C Nguyen
*Assistant Examiner* — Xanthia C Cunningham
(74) *Attorney, Agent, or Firm* — Edwards Wildman Palmer LLP

(57) ABSTRACT

A wiring harness guiding apparatus guides a wiring harness 4 between a floor of a car and a seat arranged slidably at the floor, and includes a support body 7A supporting the seat; a protector 8A guiding the airing harness 4 toward the seat; a rail arranging the support body 7A and the protector 8A slidably therein; and an excess portion receiving section receiving a excess portion of the wiring harness 4. The protector 8A includes a wiring harness fixing member 80 fixing the wiring harness 4 led into the rail; a lead-out member 83 extending with a pipe shape from the wiring harness fixing member 80 and leading the wiring harness 4 therethrough toward the slide body; and a support body mount member 87 arranged at a mounted member of the support body so as to be movable along a widthwise direction of the rail by having a clearance.

20 Claims, 14 Drawing Sheets

(51) Int. Cl.
*B60N 2/02* (2006.01)
*B60R 16/02* (2006.01)
*B60N 2/07* (2006.01)
*B60R 16/027* (2006.01)

(56) References Cited

U.S. PATENT DOCUMENTS

| | | | | |
|---|---|---|---|---|
| 5,729,436 | A * | 3/1998 | Yoshigi et al. | 361/752 |
| 6,285,565 | B1 * | 9/2001 | .ANG.berg et al. | 361/826 |
| 6,640,425 | B1 * | 11/2003 | Suzuki | 29/749 |
| 6,848,854 | B2 * | 2/2005 | Masse | 403/329 |
| 6,941,714 | B2 * | 9/2005 | Nakamura | 52/395 |
| 7,000,967 | B2 * | 2/2006 | Oshima et al. | 296/65.13 |
| 7,042,738 | B2 * | 5/2006 | Tsubaki | 361/826 |
| 7,072,188 | B2 * | 7/2006 | Janisch | 361/826 |
| 7,105,747 | B2 * | 9/2006 | Terada | 174/72 A |
| 7,152,925 | B2 * | 12/2006 | Hur et al. | 297/378.13 |
| 7,303,223 | B2 * | 12/2007 | Nakamura et al. | 296/65.15 |
| 7,402,044 | B2 * | 7/2008 | Terada | 439/34 |
| 7,473,846 | B2 * | 1/2009 | Doerr et al. | 174/69 |
| 2005/0035622 | A1 * | 2/2005 | Tsubaki et al. | 296/65.13 |
| 2006/0121760 | A1 * | 6/2006 | Kaneko | 439/212 |
| 2006/0199416 | A1 | 9/2006 | Tsubaki | |
| 2006/0226674 | A1 * | 10/2006 | Ito et al. | 296/65.13 |
| 2007/0145762 | A1 * | 6/2007 | Nihonmatsu et al. | 296/65.13 |
| 2007/0148994 | A1 * | 6/2007 | Sato et al. | 439/34 |
| 2007/0158092 | A1 * | 7/2007 | Ogawa et al. | 174/19 |
| 2008/0137322 | A1 * | 6/2008 | Kita | 361/826 |
| 2008/0197654 | A1 * | 8/2008 | Livesey et al. | 296/65.13 |
| 2008/0238126 | A1 * | 10/2008 | Koga et al. | 296/65.13 |
| 2008/0238127 | A1 * | 10/2008 | Kojima et al. | 296/65.13 |
| 2009/0129044 | A1 * | 5/2009 | Tsuchiya et al. | 361/826 |

FOREIGN PATENT DOCUMENTS

| | | |
|---|---|---|
| JP | 2006-246608 A | 9/2006 |
| JP | 2007-174740 A | 7/2007 |
| JP | 2008-220150 A | 9/2008 |

OTHER PUBLICATIONS

International Search Report dated Oct. 12, 2010, issued for PCT/JP2010/064344.
Office Action dated Jan. 8, 2014 for corresponding Chinese Patent Application No. 201080046928.3.
Communication pursuant to Article 94(3) EPC dated Mar. 27, 2014 issued for corresponding European Patent Application No. 10 815 264.6.

* cited by examiner

WIRING HARNESS GUIDING APPARATUS

TECHNICAL FIELD

This invention relates to a wiring harness guiding apparatus guiding a wiring harness between a car body, such as a floor of a car, and a slide body, such as a seat arranged slidably at the car body.

BACKGROUND ART

A car is provided with a seat as a slide body slidable about a floor of a cabin as a car body. The seat is provided with an electronic device such as a sitting sensor sensing whether or not a passenger seats on the seat. Therefore, the car including the slidable seat is provided with a various wiring harness guiding apparatus guiding a wiring harness between the floor and the seat for connecting the electronic device arranged at the seat and an electronic device fixed at the floor (see Patent Document 1).

The wiring harness guiding apparatus described in Patent Document 1 includes a wiring harness rail arranged in parallel to a support rail providing slidably a support body supporting a foot portion of the seat, and a protector arranged slidably at the wiring harness rail so as to slide interlockingly with the seat. The support rail and the wiring harness rail are arranged under a floor mat. The wiring harness rail includes a protector moving member arranging slidably the protector, which the wiring harness is provided, and an excess length receiving section receiving the excess length of the wiring harness. The protector projects through a slit arranged at the floor mat toward the cabin so as to lead one end of the wiring harness toward the seat arranged in the cabin.

Such usual wiring harness guiding apparatus has a large number of components, and requires a large mount space. Furthermore, the floor mat of a car, in which the wiring harness guiding apparatus is provided, is required to have another slit for projecting the protector therethrough to the cabin other than the slit for projecting the support body into the cabin. It is troublesome that many slits must be arranged at the floor mat.

A wiring harness guiding apparatus 100 described in Patent Document 2 includes a support body 103 supporting a foot portion 102 of a seat 101; a support rail 104 arranging slidably the support body 103; and a winding device winding the excess length of the wiring harness 105 into a spiral shape so as to receive it in a housing 107, as shown in FIG. 13.

According to the winding device 106, one end 105a of the wiring harness 105 which is led from a lead out opening 107a of the housing 107, is led through an opening arranged at one end of the support rail 104 into the support rail 104 and passed through the support rail 104, and passed through a guide pipe (not shown) arranged inside the support body 103, and led through an opening arranged at the support body 103 to an outside of the support body 103, and to the foot portion 102. In FIG. 13, the floor mat is omitted, and is provided with a slit, which the support body 103 arranged slidably at the support rail 104 projects through.

The winding device 106 includes a housing 107, a reel 132 and a spiral spring 133 as shown in FIG. 14. The reel 132 is supported by a shaft at the center area of the housing 107, and the other end 105b of the wiring harness 105 is led out from the central area so as to be fixed at the central area. Thereby, when the reel 132 is rotated in one direction, the wiring harness 105 is wound around it. One end of the spiral spring 133 is fixed at the housing 107 and the other end of the spiral spring 133 is engaged with the reel 132. The spiral spring generates a bias force for rotating the reel 132 in the one direction. The wiring harness 105 is wound by the bias force, or pulled against the bias force and supported continuously with tension.

In such wiring harness guiding apparatus 100, the wiring harness 104 is pulled in the support rail 104, and the wiring harness rail described in Patent Document 1 is eliminated, so that amount space for arranging the wiring harness rail is not required, and number of slits provided at the floor mat can be reduced.

CITATION LIST

Patent Document

Patent Document 1: Japan Patent Application Published No. 2006-42457
Patent Document 2: Japan Patent Application Published No. 2005-313662

SUMMARY OF INVENTION

Objects to be Solved

According to the wiring harness guiding apparatus 100 shown in FIGS. 13 and 14, there is a problem that the winding device 106 having the very complicated structure as mentioned above is required. Furthermore, a length of one side of the housing 107 of the winding device 106 can not be sized smaller than a diameter of the wound wiring harness spirally. And, the structure has a two-rooms stacked structure of the reel 132 and the spiral spring 133, so that there is a problem that a large mount space is required. Furthermore, according to the wiring harness guiding apparatus, it is required that the guide pipe is arranged in a room inside the support body 103, and the large opening for passing the one end 105a of the wiring harness 105 led from the guide pipe is provided at the support body 103, so that there is a problem that the support body 103 becomes very complicated structure. Assembling process of mounting the guide pipe to the support body 103 and passing the wiring harness 105 through the mounted guide pipe is very troublesome and not operated easily.

According to the above problems, an object of the present invention is to provide a wiring harness guiding apparatus, which requires no large space and can be structured simply, and be assembled easily.

How to Attain the Object of the Present Invention

In order to overcome the above problems and attain the object, the present invention is to provide a wiring harness guiding apparatus which is for guiding a wiring harness between a car body and a slide body supported by a support body arranged slidably at a long-pipe-shaped rail fixed at the car body, and includes a protector having a wiring harness fixing member fixing the wiring harness led from an opening arranged at one end along a lengthwise direction of the rail into the rail; a lead-out member extending with a pipe shape from the wiring harness fixing member so as to pass through a slit arranged between one end and the other end of the rail provided along a lengthwise direction of the rail to an outside of the rail, and leading the wiring harness therethrough toward the slide body; and a support body mount member arranged at a mounted member of the support body so as to be movable along a widthwise direction of the rail by having a clearance.

The present invention is characterized in that the support body mount member is provided with a hole which locates the mounted member projecting in a height direction of the rail inside the hole; and a length of the hole along the widthwise direction of the rail is formed larger than a length of the mounted member along the widthwise direction of the rail; and the protector is mounted at the support body movably in the widthwise direction and the height direction of the rail by engaging the support body mount member with the mounted member.

The present invention is characterized in that the support body mount member is arranged on an extension line of a center axis of the wiring harness mounted at the wiring harness fixing member.

The present invention is characterized in that the support body mount member is located at a position in which the support body mount member overlaps to the slit of the rail.

The present invention is characterized in that the protector is provided at an outer surface thereof with a rib extending along a lengthwise direction of the rail and sliding on an inner surface of the rail.

The present invention is characterized in that the wiring harness mount member is located at a position which the wiring harness has a displacement along the widthwise direction of the rail from the slit opening at a top of the rail; and the lead-out member includes a first lead-out member extending with a pipe shape along a widthwise direction of the rail from the wiring harness mount member and a second lead-out member extending with a pipe shape along a height direction of the rail from the first lead-out member so as to pass through the slit to the outside of the rail and be formed into an L-shape pipe.

The present invention is characterized in that the protector is provided with a support body overlap member extending from an outer surface of the second lead-out member along a widthwise direction of the rail so as to part from the wiring harness mount member and overlapping on the support body.

The present invention is characterized in that the protector is provided with a rail contact member extending from an outer surface of the second lead-out member along a widthwise direction of the rail so as to part from the wiring harness mount member and contacting on an inner surface of the rail.

The present invention is characterized in that the apparatus further includes an excess portion receiving section including a parallel portion receiving an excess portion of the wiring harness, which is led out from the opening to the outside of the rail and formed into U shape; and a connecting section guiding the excess length of the wiring harness, which is led from the opening to the outside of the rail, toward the parallel portion.

Effects of the Invention

According to the present invention claimed in claim 1, the protector having the wiring harness fixing member fixing the wiring harness led from the opening arranged at the one end along the lengthwise direction of the rail into the rail; the lead-out member extending with a pipe shape from the wiring harness fixing member so as to pass through the slit arranged between one end and the other end of the rail provided along a lengthwise direction of the rail to the outside of the rail, and leading the wiring harness therethrough toward the slide body; and the support body mount member arranged at the mounted member of the support body so as to be movable along a widthwise direction of the rail by having a clearance. Thereby, the wiring harness guiding apparatus, which requires no large space and can be structured simply, and be assembled easily, can be provided, and the wiring harness can be prevented by the protector from damage caused by hitting the wiring harness to the support body or the rail. When the support body moves with rattle motion by sliding, the protector can move about the support body not to be influenced by a rattle motion along the widthwise direction of the support body. When the support body has dispersion of widthwise length, the protector can move against the support body so as to absorb the dispersion of the length. Thus, a large space for a protector receiving space, that is wiring harness receiving space, can be secured, so that the rail can be miniaturized.

According to the invention claimed in claim 2, the support body mount member is provided with the hole which locates the mounted member projecting in a height direction of the rail inside the hole; and the length of the hole along the widthwise direction of the rail is formed larger than the length of the mounted member along the widthwise direction of the rail; and the protector is mounted at the support body movably in the widthwise direction and the height direction of the rail by engaging the support body mount member with the mounted member. Thereby, the wiring harness guiding apparatus, which can apply simply structured support body and protector, and can be assembled easily, can be provided. When the support body has dispersion of widthwise length and height, the protector can move against the support body so as to absorb the dispersion of the dispersion. Thus, a large space for a protector receiving space, that is wiring harness receiving space, can be secured, so that the rail can be miniaturized According to the invention claimed in claim 3, the support body mount member is arranged on the extension line of the center axis of the wiring harness mounted at the wiring harness fixing member. Thereby, when the protector slides, a direction of load acting on the support body mount member becomes parallel to the direction of the protector sliding. The protector can be prevented from moving in rotational direction around the support body mount member, so that the protector can move smoothly.

According to the invention claimed in claim 4, the support body mount member is located at the position in which the support body mount member overlaps to the slit of the rail. Thereby, for the mounted member having a structure assembled by inserting a bolt or a pin into the support body, when the support body mount member is mounted on the mounted member, by moving the protector close to the support body positioned in the rail, and inserting the bolt or the pin into the rail from an outside of the slit, and hooking the support body mount member by the bolt or the pin, inserting the bolt or pin into the support body, the support body mount member can be mounted on the mounted member easily not by drawing the support body from the rail.

According to the invention claimed in claim 5, the protector is provided at an outer surface thereof with the rib extending along a lengthwise direction of the rail and sliding on the inner surface of the rail. Thereby, when the protector is sliding, a friction force between the protector and the inner surface of the rail can be reduced, so that the protector can slide smoothly.

According to the invention claimed in claim 6, the wiring harness mount member is located at the position which the wiring harness has a displacement along the widthwise direction of the rail from the slit opening at the top of the rail; and the lead-out member includes the first lead-out member extending with a pipe shape along a widthwise direction of the rail from the wiring harness mount member and the second lead-out member extending with a pipe shape along the height direction of the rail from the first lead-out member so as to pass through the slit to the outside of the rail and be formed into an L-shape pipe. Thereby, when an unexpected object, such as a stick, is inserted through the slit into the rail, it can be prevented that the unexpected object touches the wiring harness mount member and the wiring harness. Thus, the wiring harness mount member and the wiring harness can be prevented from damage.

According to the invention claimed in claim 7, the protector is provided with the support body overlap member extending from an outer surface of the second lead-out member along the widthwise direction of the rail so as to part from the wiring harness mount member and overlapping on the support body. Thereby, the protector can be prevented form tilting, so that the protector can slide smoothly.

According to the invention claimed in claim 8, the protector is provided with the rail contact member extending from the outer surface of the second lead-out member along the widthwise direction of the rail so as to part from the wiring harness mount member and contacting on an inner surface of the rail. Thereby, the protector can be prevented form tilting and rotating around the support body mount member, so that the protector can slide smoothly.

According to the invention claimed in claim 9, the apparatus further includes an excess portion receiving section including the parallel portion receiving an excess portion of the wiring harness, which is led out from the opening to the outside of the rail and formed into U shape; and the connecting section guiding the excess length of the wiring harness, which is led from the opening to the outside of the rail, toward the parallel portion. Thereby, comparing with a wiring harness guiding apparatus by prior art which a spirally-wound wiring harness is received in a housing, the wiring harness guiding apparatus according to the present invention can be structured very simply. Furthermore, the length along the width of the parallel portion can be configured smaller than a length of the side of the housing. And the length along the lengthwise direction of the parallel portion can be configured smaller than a slide range of the protector. Thus, the wiring harness guiding apparatus can be configured compact and simple.

DESCRIPTION OF EMBODIMENTS

First Embodiment

Figure 1:
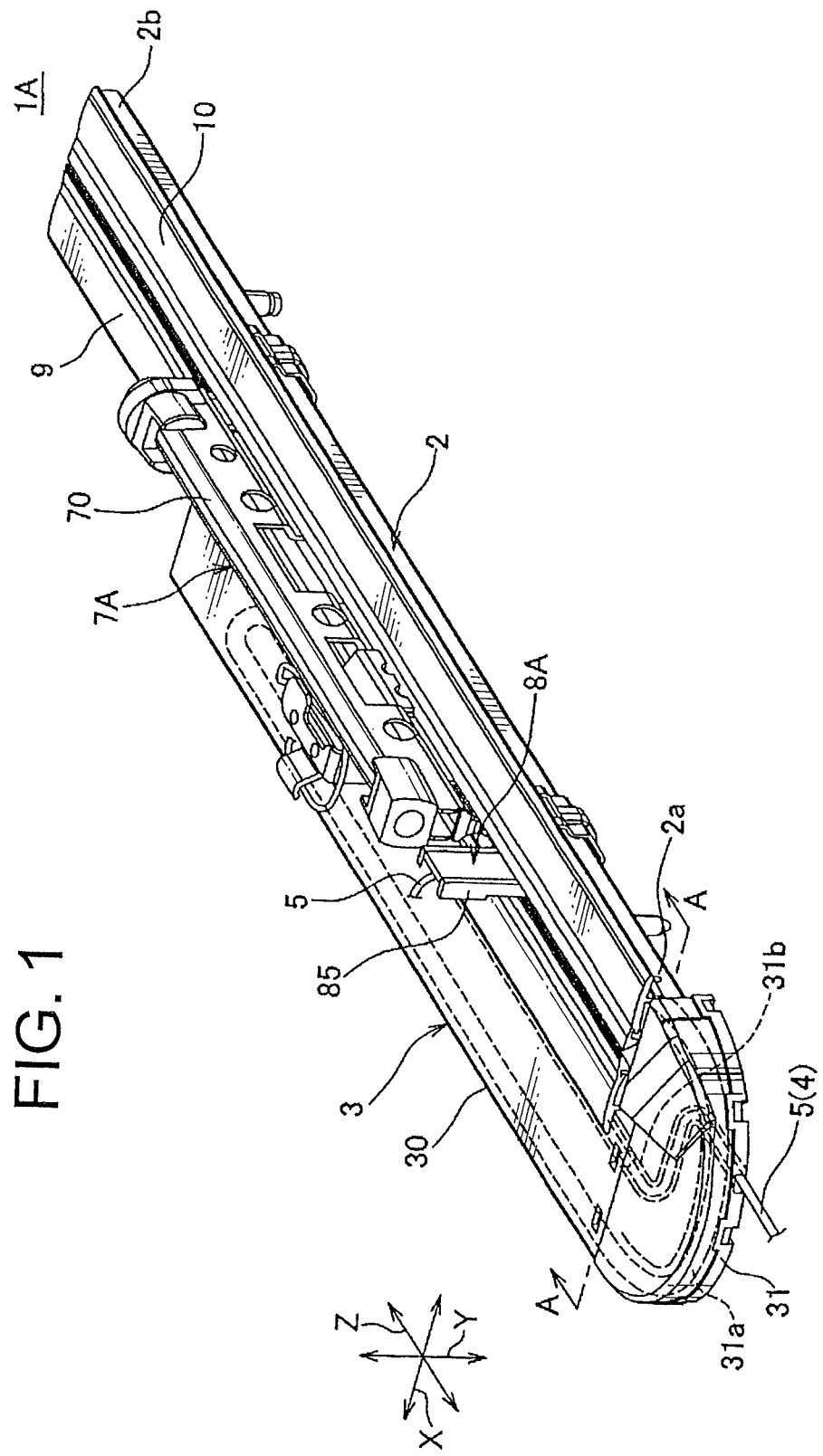
FIG. 1 is a perspective view of a wiring harness guiding apparatus of the first embodiment according to the present invention.

A wiring harness guiding apparatus of a first embodiment according to the present invention will be described with reference to drawings FIGS. 1-7.

A wiring harness guiding apparatus 1A guides a wiring harness 4 between a floor 11 (shown with a two-dot chain line in FIG. 2) of a cabin as a car body of a car, and a seat arranged slidably about the floor 11 as a sliding body. A floor mat 12 is provided on the floor 11 (shown with a two-dot chain line in FIG. 2).

The above-mentioned seat is provided with electronic devices, such as a sitting sensor sensing whether or not a passenger seats on the seat, and a seat-belt sensor sensing whether or not the passenger sat on the seat wears a seat belt. The seat (not shown) is arranged above the floor 11 and the floor mat 12 along a direction shown by an arrow Y in FIG. 2.

The wiring harness 4 includes at least one electric wire 5 and a corrugate tube 6 receiving the electric wire 5. The electric wire 5 is a covered wire and connects the electronic devices arranged at the seat and an electronic device mounted at the floor 11, that is the car body, such as an ECU (Electronic Control Unit). The corrugate tube 6 is made of synthetic resin such as polypropylene, and formed into a bellows shape tube configured to alternate a small diameter trough portion and a large diameter crest portion successively, and protects the electric wire 5 by passing the electric wire 5 inside thereof.

The above-mentioned wiring harness guiding apparatus 1A includes a support body 7A supporting the seat, a protector 8A guiding the wiring harness 4 toward the seat, a rail 2 fixed on the floor 11 and arranging the support body 7A and the protector 8A slidably, a pair of moles 9, 10, and an excess portion receiving section 3 receiving an excess portion of the wiring harness 4 so as to be freely led in and out, as shown in FIG. 1.

An arrow Z shown in FIGS. 1-7 indicates a direction of sliding the seat, that is a lengthwise direction of the rail 2. In this embodiment, the arrow Z is in parallel to a forward-rearward direction of the car. One end 2a of the rail 2 along the lengthwise direction is located at a front side of the car, and the other end 2b of the rail 2 is located at a rear side of the car. An arrow X indicates a direction of widthwise of the rail 2. In this embodiment, the arrow X is in parallel to a widthwise direction of the car. An arrow Y indicates a height direction of the rail 2, that is a vertical direction.

Figure 2:
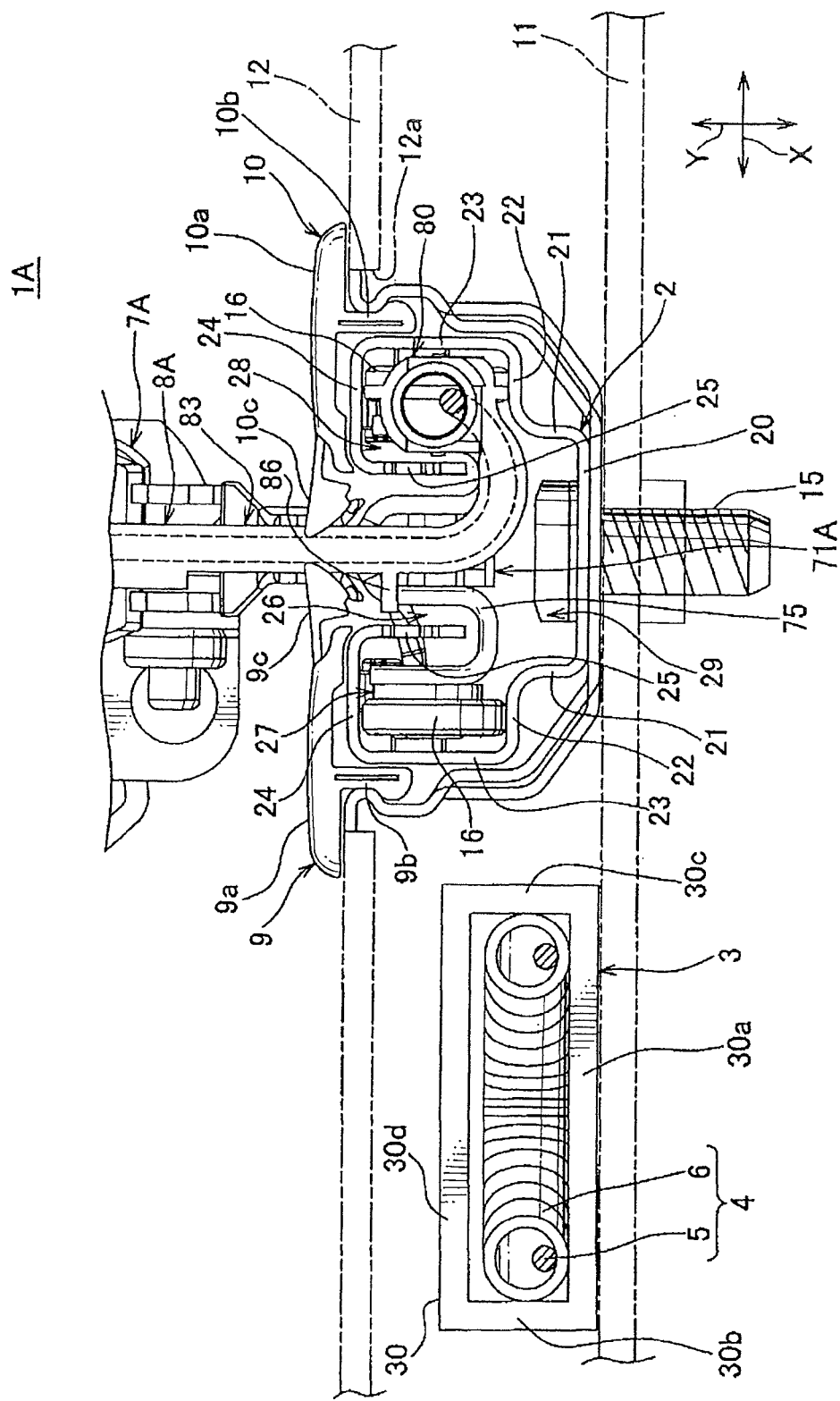
FIG. 2 is a cross-sectional view taken along the line A-A shown in FIG. 1.
Figure 3:
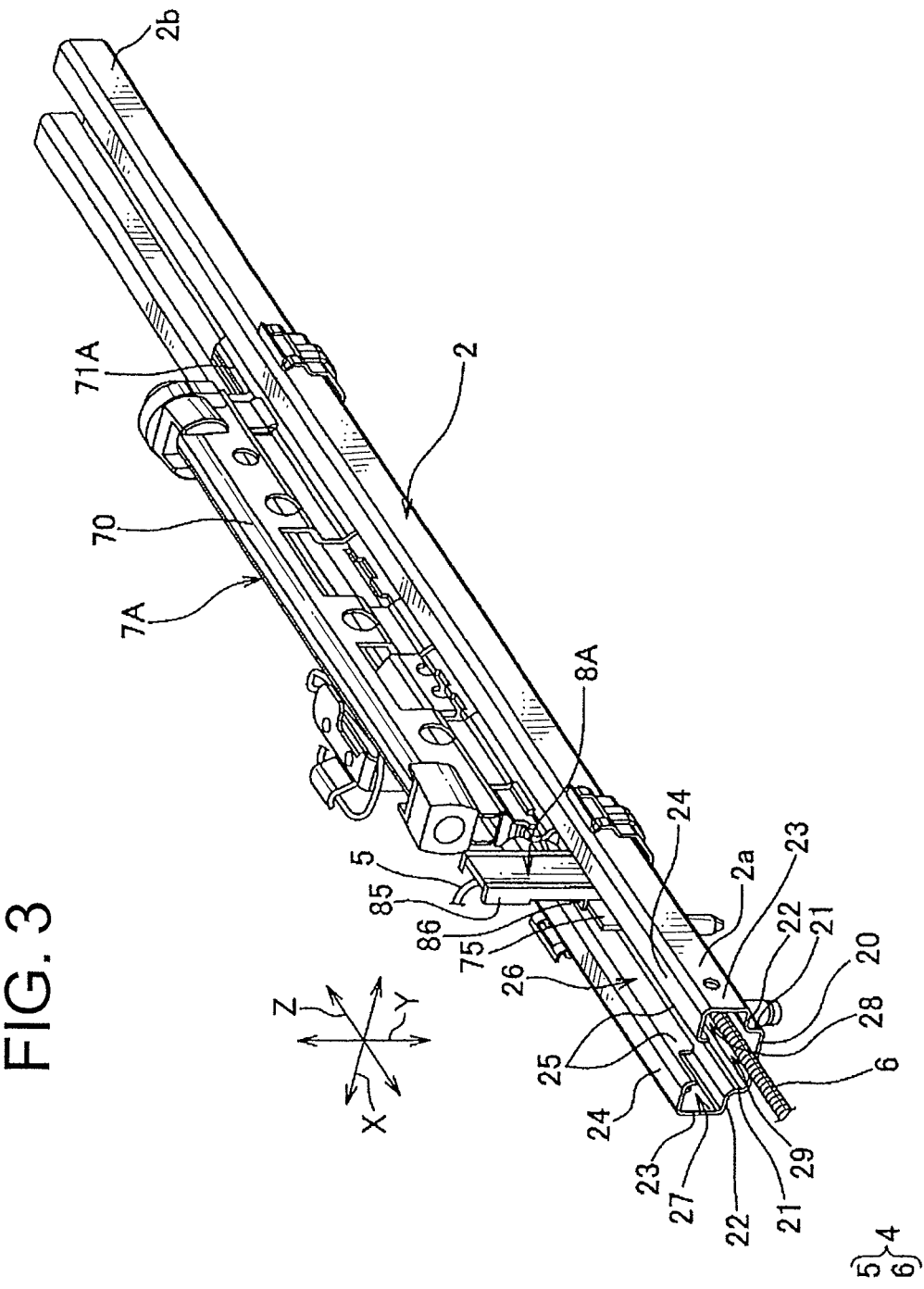
FIG. 3 is a perspective view of a rail of the wiring harness guiding apparatus shown in FIG. 1.
Figure 7:
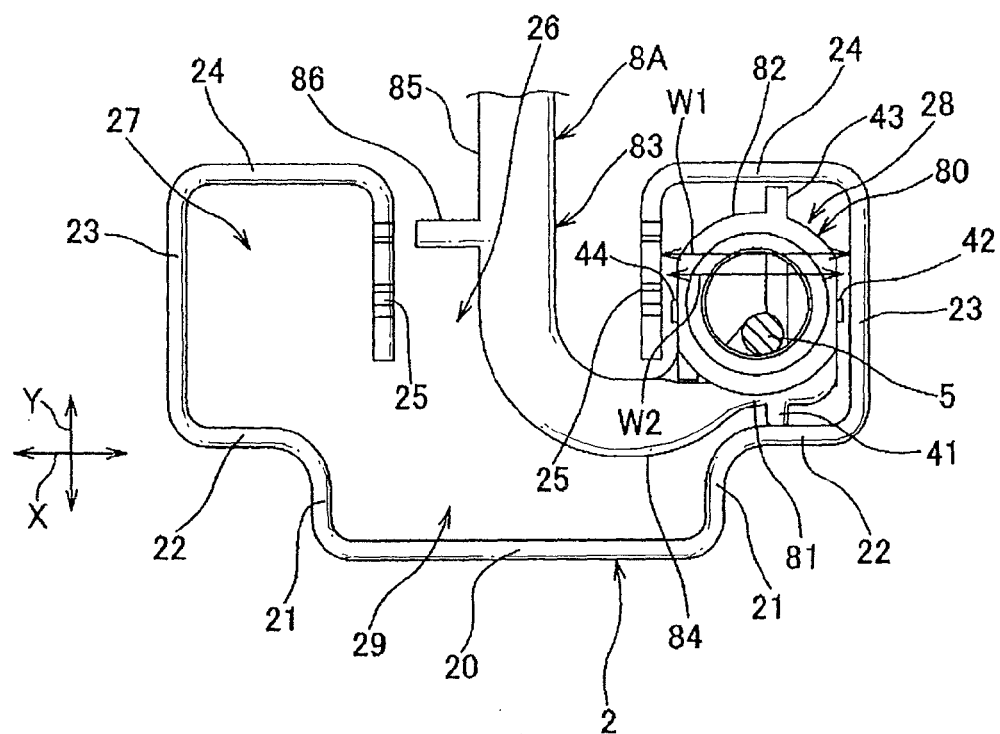
FIG. 7 is an expanded view of main area of the rail and the protector shown in FIG. 2.

The rail 2 is fixed on the floor 11 by a bolt 15 and arranged under the floor mat 12. The rail 2 is made by cutting a long metal band to have predetermined length, and forming the cut metal band by roll forming. The rail 2 is structured by a flat bottom wall 20 arranged on the floor 11; a pair of side walls 21 extending vertically from both side edges of the bottom wall 20 in a widthwise direction (arrow X direction) toward the seat, that is upwardly; a pair of lower walls 22 extending from a top edge of each of the side walls 21 so as to be apart from each other and correspond to the floor 11; a pair of second side walls 23 extending vertically from a side edge of each of the lower walls 22, which is farther side from the side walls 21, toward the seat, that is upwardly; a pair of top walls 24 extending from a top edge of each of the second side walls 23 so as to be close to each other and correspond to the lower walls 22; and a pair of inner walls 25 extending from a side edge of each of the top walls 24, which is farther side from the second side walls 23, toward the bottom wall 20, as shown in FIGS. 2, 3 and 7. The rail 2 if configured to have constant cross-section from the one end 2a to the other end 2b in the lengthwise direction (arrow Z direction), as shown in FIG. 3. Thus, the rail 2 is formed into a long tube shape so as to have an opening at the one end 2a in the lengthwise direction of the rail 2.

The above-mentioned pair of inner walls 25 is separated to each other and separated to the bottom wall 20. Thereby, the pair of inner walls 25 is provided with a slit 26 opening toward the top surface of the rail 2, that is toward the seat, and extending from the one end 2a to the other end 2b along the lengthwise direction of the rail 2. At both sides of the slit 26 along the arrow X direction, a pair of spaces 27, 28 surrounded by the lower wall 22, the second side wall 23 and the inner wall 25 is formed. Under the slit 26 and the pair of spaces 27, 28, a space 29 communicating the slit 26 and the pair of spaces 27, 28 is formed.

The pair of moles 9, 10 is mounted at an outer surface of each of the pair of top walls 24, as shown in FIGS. 1 and 2. The pair of moles 9, 10 is formed into a long bar shape extending along the arrow Z direction and symmetric about an imaginary axis parallel to the arrow Y. The pair of moles 9, 10 is formed integratedly by a mount portion 9a, 10a overlapped on the outer surface of each top wall 24, a second mount portion 9b, 10b overlapped on an outer surface of each second side wall 23, and a cover portion 9c, 10c covering the slit 26 so as to protect from unexpected objects such as dust going through the split 26 into the rail 2. The cover portion 9c, 10c is formed by flexible synthetic resin so as to be elastically deformed easily when the cover portion 9c, 10c touches the support body 7A and the protector 8A.

Figure 4:
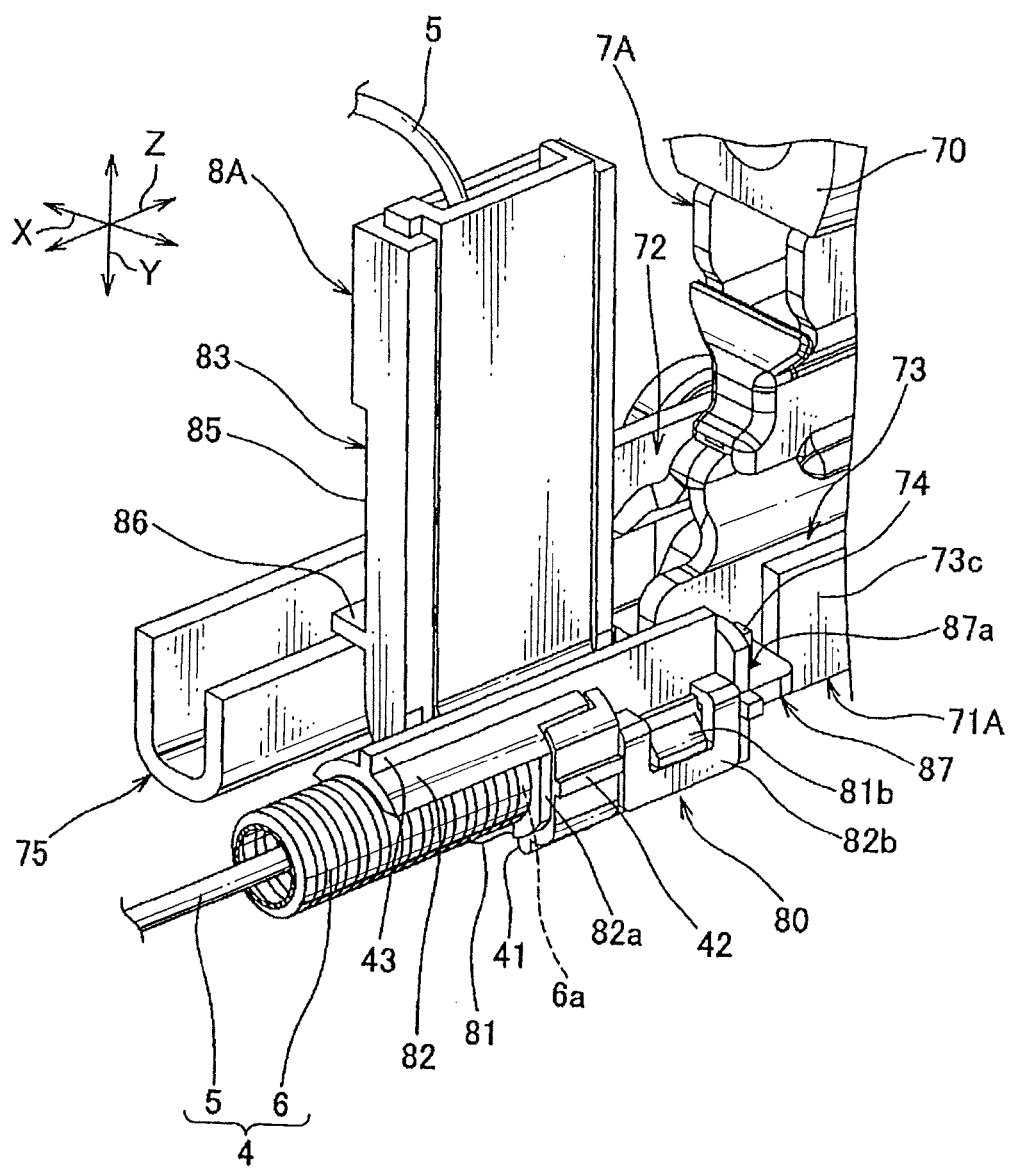
FIG. 4 is a perspective view of a support body and a protector of the wiring harness guiding apparatus shown in FIG. 1.
Figure 5:
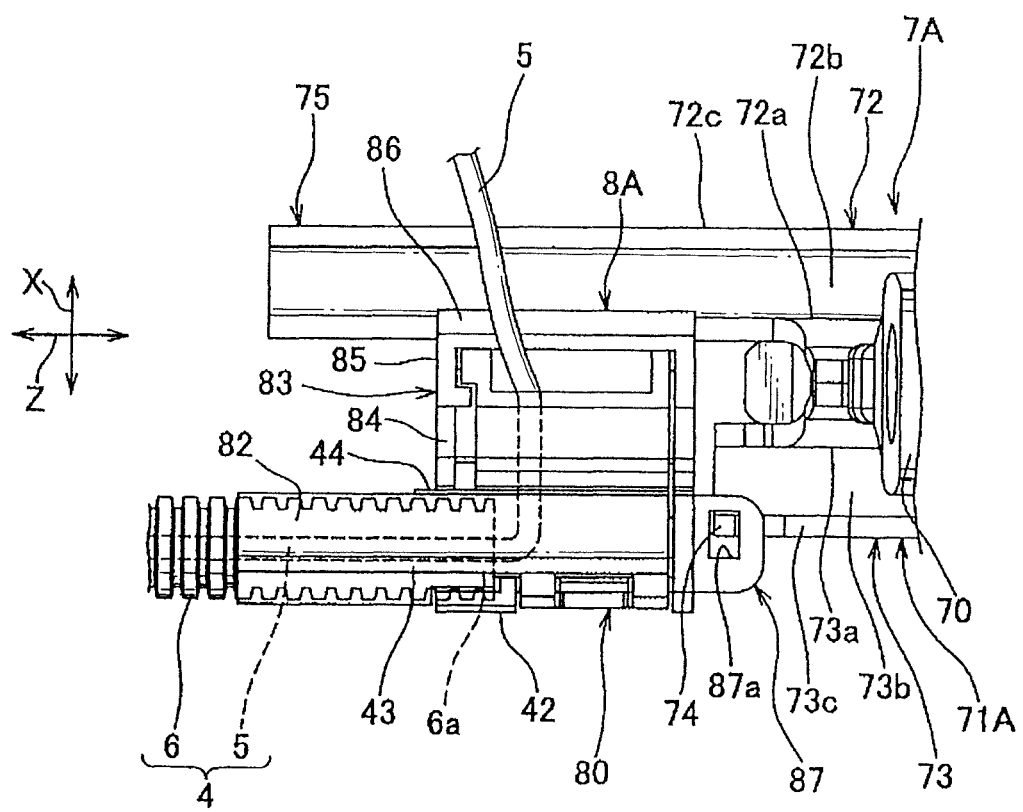
FIG. 5 is a plan view of the support body and the protector shown in FIG. 4.
Figure 6:
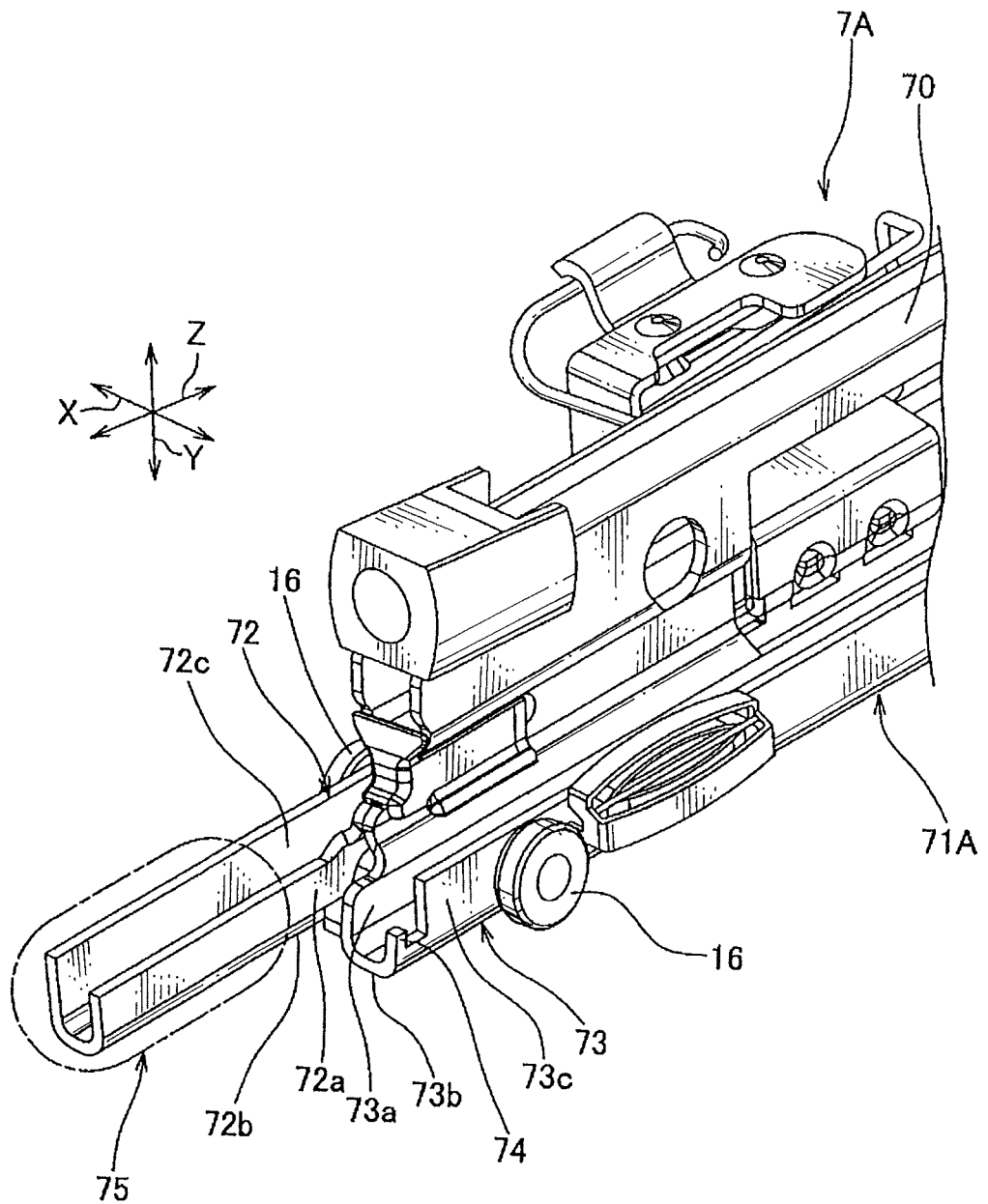
FIG. 6 is a perspective view of the support body shown in FIG. 4.

The above-mentioned support body 7A is made of sheet metal by roll forming, press process and welding. As shown in FIGS. 4-6, the support body 7A includes a seat mount member 70 mounted to the seat, a slide member 71A received slidably along the arrow Z direction in the rail 2, a mounted member 74 on which a later-described support body mount member 87 of the protector 8A is mounted, and a stopper 75.

The seat mount member 70 is arranged above the slit 26, that is outside the rail 2, and projects through a slit 12a provided at the floor mat 12 toward the cabin.

The slide member 71A includes a first slide portion 72 formed to have a U-shape cross-section and be continued to a bottom edge of the seat mount member 70, and a second slide portion 73 similarly formed to have a U-shape cross-section and be continued to the bottom edge of the seat mount member 70. The first slide portion 72 and the second slide portion 73 are formed symmetrically about an imaginary axis parallel to the arrow Y direction. Each of the first slide portion 72 and the second slide portion 73 is formed into U-shape by an inner side plate 72a, 73a extending with plate shape downwardly from the bottom edge of the seat mount member 70, a bottom plate 72b, 73b extending from a bottom edge of each inner side plate 72a, 73a so as to be apart from each other and an outer side plate 72c, 73c extending with plate shape upwardly, that is toward the seat mount member 70, from an outer edge of each bottom plate 72b, 73b. Each of the outer side plates 72c, 73c is provided with a wheel 16. One outer side plate 72c and the wheel 16 arranged at the one outer side plate 72c are received slidably along the arrow Z direction in the space 27 of the rail 2. The other outer side plate 73c and the wheel 16 arranged at the other outer side plate 73c are received slidably along the arrow Z direction in the space 28 of the rail 2.

The mounted member 74 is arranged at an end of the outer side plate 73c, which end is located closer to one end 2a of the rail 2. The mounted member 74 is formed into a protrusion shape projecting from the bottom plate 73b toward the seat mount member 70 by cutting off a portion of the outer side plate 73c other than the mounted member 74. In other words, the mounted member 74 projects along the height direction (the arrow Y direction) of the rail 2.

The stopper 75 is configured to extend the first slide member 72 from an end position at the one end 2a of the rail 2 along lengthwise direction (the arrow Z direction) of the first slide member 72 with U-shape cross-section as same as the first slide member 72. When the slide member 71A slides toward the one end 2a in the rail 2, the stopper 75 abuts on a later-described connecting section 31 of the excess portion receiving section 3 so as to stop sliding of the slide member 71A. The stopper 75 is formed to project apart from the slide member 71A further than the protector 8A mounted at the mounted member 74. Thereby, when the slide member 71A slides toward the one end 2a in the rail 2, the protector 8A can be prevented from hitting the later-described connecting section 31 of the excess portion receiving section 3.

The protector 8A is structured by engaging two synthetic resin components to each other. As shown in FIGS. 2, 4, 5 and 7, the protector 8A includes a wiring harness fixing member 80 received slidably along the arrow Z direction in the space 28 of the rail 2, and mounting one end 6a of the corrugate tube 6 of the wiring harness 4 which is pulled out from the excess portion receiving section 3 and led from the opening at the one end 2a of the rail 2 into the space 28; a lead-out member 83 extending from the wiring harness fixing member 80 with L-shape pipe, and leading the electric wire 5 therethrough toward the seat, which the electric wire 5 is led to the cabin through the slit 26 of the rail 2 and the slit 12a of the floor mat 12 out of one end 6a of the corrugate tube 6 mounted at the wiring harness fixing member 80; a support body mount member 87 mounted to the mounted member 74 of the support body 7A so as to be movable along the widthwise direction of the rail 2 by having a clearance; and a support body overlap member 86.

The above-mentioned wiring harness fixing member 80 is structured by a pair of clamp plates 81, 82 opposing to each other in the arrow Y direction and clamping the one end 6a of the corrugate tube 6 therebetween. The clamp plate 82 is provided with a tooth 82a penetrating into the trough portion of the corrugate tube 6, that is between the adjacent crest portions. Each of the pair of clamp plates 81, 82 is provided with a lock portion 81b, 62b locked to each other. To the wiring harness fixing member 80, the wiring harness 4, that is one end 6a of the corrugate tube 6, is mounted so as to align the center line of the corrugate tube 6 in parallel to a direction of sliding the support body 7A, that is the arrow Z direction.

As mentioned above, according to this invention, the wiring harness fixing member 80 is received slidably in the space 28 arranged with displacement along the slit 26 and the widthwise direction of the rail 2. Thereby, when unexpected object, such as a stick, is inserted through the slit 26, it is prevented that the unexpected object touches the wiring harness fixing member 80 and the wiring harness 4 which are received in the space 28. Thus, the wiring harness fixing member 80 and the wiring harness can be prevented from damage.

The lead-out member 83 is formed into L-shape pipe including a first lead-out member 84 continued to the wiring harness fixing member 80 and extending with rectangular pipe shape along a direction perpendicular to the center axis of the corrugate tube 6 mounted at the wiring harness fixing member 80; and a second lead-out member 85 extending with a rectangular pipe shape upwardly along the height direction from an end of the first lead-out member 84 farther from the wiring harness fixing member 80 and projecting through the slit 26 outside the rail 2.

As shown in FIG. 5, the support body mount member 87 extends with a plate shape from one end of the wiring harness fixing member 80 and includes a hole 87a positioning the mounted member 74 inside thereof. A length of the hole 87a along the widthwise direction of the rail 2 and a length of the hole 87a along the lengthwise direction of the rail 2 are formed larger than a length of the mounted member 74 along the widthwise direction of the rail 2 and a length of the mounted member 74 along the lengthwise direction of the rail 2. By engaging the support body mount member 87 with the mounted member 74, the protector 8A is mounted movably along the widthwise direction and height direction of the rail 2 at the support body 7A. The support body mount member 87 can be engaged with the mounted member 74 under condition that the mounted member 74 is drawn out from the rail 2.

In the present invention, a clearance arranged at the hole 87a of the support body mount member 87 so as to make it removable along the widthwise direction of the rail 2, that is difference between length of the hole 87a along the widthwise direction of the rail 2 and a length of the mounted member 74 along the widthwise direction of the rail 2, may be most preferably larger than a sum of an estimated tolerance of the rail 2 along the widthwise direction of the rail 2 when the support body 7A slides in the rail 2 and an estimated tolerance of the support body 7A along the widthwise direction of the rail 2 (that is dispersion of the support body 7A by molding process and dispersion by combination on assembling). Thus, when the support body 7A slides in the rail 2 with a rattle motion along the widthwise direction of the rail 2, the protector 8A can move about the support body 7A by arranging the clearance between the hole 87a of the support body mount member and the mounted member, so that the protector 8A can slide without rattle motion according to the rattle motion of the support body 7A along the widthwise direction thereof. In addition, when the support body 7A has the dispersion of the length of the support body 7A along the widthwise direction of the rail 2, the dispersion can be absorbed by moving the protector 8A about the support body 7A. Thereby, large protector receiving space in the rail 2, that is wiring harness receiving space can be secured. It results in that the rail 2 can be miniaturized. In other words, in the present invention, the protector receiving space (see W2 in FIG. 7) can be given by a difference of subtracting a slide gap of the protector 8A and a dispersion of molding from an inner length of the rail 2 (see W1 in FIG. 7).

When the support body 7A and the protector 8A would be fixed tightly by a bolt as an example for comparing with the present invention, the protector receiving space should be determined by a difference of subtracting the estimated tolerance of the rail 2 along the widthwise direction of the rail 2 when the support body 7A slides in the rail 2 and the estimated tolerance of the support body 7A along the widthwise direction of the rail 2 (that is dispersion of the support body 7A by molding process and dispersion by combination on assembling), the dispersion of molding and dispersion by combination of the support body 7A and the protector 8A from the inner length of the rail 2, so that the protector receiving space becomes smaller than that given by the present invention, and the rail cannot be miniaturized easily.

According to the present invention, the protector 8A is mounted movably along the widthwise direction and height direction of the rail 2 at the support body 7A by engaging support body mount member 87 having the hole 87a with the projecting mounted member 74. Thereby, the support body 7A and the protector 8A can be designed to have a simple structure and the wiring harness guiding apparatus 1A, which can be easily assembled, is provided. When the support body 7A has a dispersion of length thereof along the height direction of the rail 2, the dispersion can be absorbed by moving the protector 8A about the support body 7A. Thus, the large protector receiving space in the rail 2 can be secured not only along widthwise direction but also along the height direction of the rail 2.

According to the present invention, the support body mount member 87 is arranged on an extension line of a center axis of the wiring harness 4, that is corrugate tube 6, mounted at the wiring harness fixing member 80. Thereby, when the protector 8A slides, a direction of load acting on the support body mount member 87 becomes parallel to the direction of the protector 8A sliding. The protector 8A can be prevented from rotating around the support body mount member 87, so that the protector 8A can move smoothly. The load acting on the support body mount member 87 corresponds to a load of gravity of the wiring harness 4 and a friction force generated between the wiring harness 4 and the inner surface of the rail 2.

The support body overlap member 86 extends with a plate shape from an outer surface of the second lead-out member 85 along the widthwise direction of the rail 2 parting from the wiring harness fixing member 80. As shown in FIGS. 2 and 4, the support body overlap member 86 is overlapped on the stopper 75 of the support body 7A. According to the present invention, the support body overlap member 86 prevents that the protector 8A tilts toward the space 27 of the rail 2, so that the protector 8A can slide smoothly.

As shown in FIGS. 4 and 7, ribs 41, 42, 43 and 44 extending along the widthwise direction are arranged on an outer surface of the wiring harness fixing member 80 so as to slide on the inner surface of the rail 2. According to the present invention, by providing the ribs 41, 42, 43 and 44, the friction force generated between the wiring harness fixing member 80 and the inner surface of the rail 2 when the protector slides can be reduced, so that the protector can slide smoothly.

The protector 8A structured as mentioned above is mounted at the support body 7A by engaging the support body mount member 87 with the mounted member 74 of the support body 7A. The protector 8A mounted at the support body 7A is arranged along the support body 7A and the arrow Z direction. The protector 8A mounted at the support body 7A slides interlockingly with the support body 7A, that is seat, and simultaneously moves the wiring harness 4 according to movement of the seat. Both of the support body 7A and the second lead-out member 85 of the protector 8A is passed through the slit 12a of the floor mat 12.

According to the present invention, the support body 7A and the protector 8A are arranged in a line along the lengthwise direction of the rail 2, and in addition, the protector 8A and the wiring harness 4 are received slidably in the rail 2, in which usually only support body 7A was received slidably. Thereby, an exclusive rail for arranging the protector 8A slidably is not required, so that the wiring harness guiding apparatus 1A can be designed compact and simple with small number of components. The wiring harness guiding apparatus 1A, which requires not large mount space, can be provided. Both of the support body 7A and the second lead-out member 85, that is wiring harness 4, can be passed through the slit 12a of the floor mat 12 which usually only support body 7A is passed through, so that the number of the slit 12a arranged at the floor mat 12 can be reduced.

According to the present invention, by applying the protector 8A, the wiring harness 4 is protected by the lead-out member 83, and led through the rail 2 toward the seat as the slide body. Thereby, the wiring harness 4 can be smoothly led into and out from the rail 2, that is moved in the rail 2. Simultaneously, it is prevented that the wiring harness 4 is damaged by a sharp corner of the rail 2 (for example, a lower edge of the inner wall) or the support body 7A hitting the wiring harness 4.

As shown in FIG. 1, the excess portion receiving section 3 is for receiving the excess portion of the wiring harness 4 which is led out from the opening of the rail 2 toward the outside of the rail 2, and fixed at the floor 11 and arranged under the floor mat 12. The excess portion receiving section 3 includes a parallel section 30 arranged in parallel to the rail 2 so as to receive the excess portion of the wiring harness 4 formed into U-shape, and the connecting section 31 guiding the excess portion of the wiring harness 4, which is led from the opening of the rail 2 toward the outside of the rail 2, toward the parallel section 30. In this embodiment, the parallel section 30 and the connecting section 31 are formed separately and assembled to each other.

The parallel section 30 is formed into a rectangular pipe shape by bending sheet metal, and as shown in FIG. 2, includes a bottom wall 30a placed on the floor 11, a pair of side walls 30b, 30c extending vertically from each of both ends of the bottom wall 30a and a top wall 30d opposing to the bottom wall 30a. The parallel section 30 is arranged adjacent to the one space 27 of the rail 2.

The connecting section 31 is formed into a half disk shape by synthetic resin so as to guide the excess portion of the wiring harness 4, which is led from the opening of the rail 2 and bent to U-shape, toward the parallel section 30. The electric wire 5 of the wiring harness 4, which is guided and folded into U-shape in the parallel section 30 by the guide portion 31a, is led out from the other end of the corrugate tube 6 arranged at one end of the parallel section 30. The connecting section includes a guide portion 31a guiding the excess portion of the wiring harness 4 so as to touch an inner surface of the side wall 30b farther from the rail 2, and a second guide portion 31b crossing the electric wire 5 at a height different from that of the guide portion 31a along up/down direction. The electric wire 5, which is led to the outside of the excess portion receiving section 3 by the second guide portion 31b, is electrically connected directly or through the other electric wire with the electronic apparatus mounted at the floor 11, that is car body.

As mentioned above, the excess portion of the wiring harness 4, which is guided and led in the parallel section 30 by the guide portion 31a, is folded into U-shape in the parallel section 30, and this folded portion touches the inner surface of the side wall 30c closer to the rail 2 by an elastic restoring force of the corrugate tube 6. In other words, the excess portion of the wiring harness 4 is bent twice along the same bending direction and intended to expand in the parallel section 30 by the elastic restoring force generated in the corrugate tube 6 so as to touch the inner surface of the side wall 30b and the inner surface of the side wall 30c. In this embodiment, the same bending direction means a direction in which some bending portions form a spiral shape as a whole.

Figure 13:
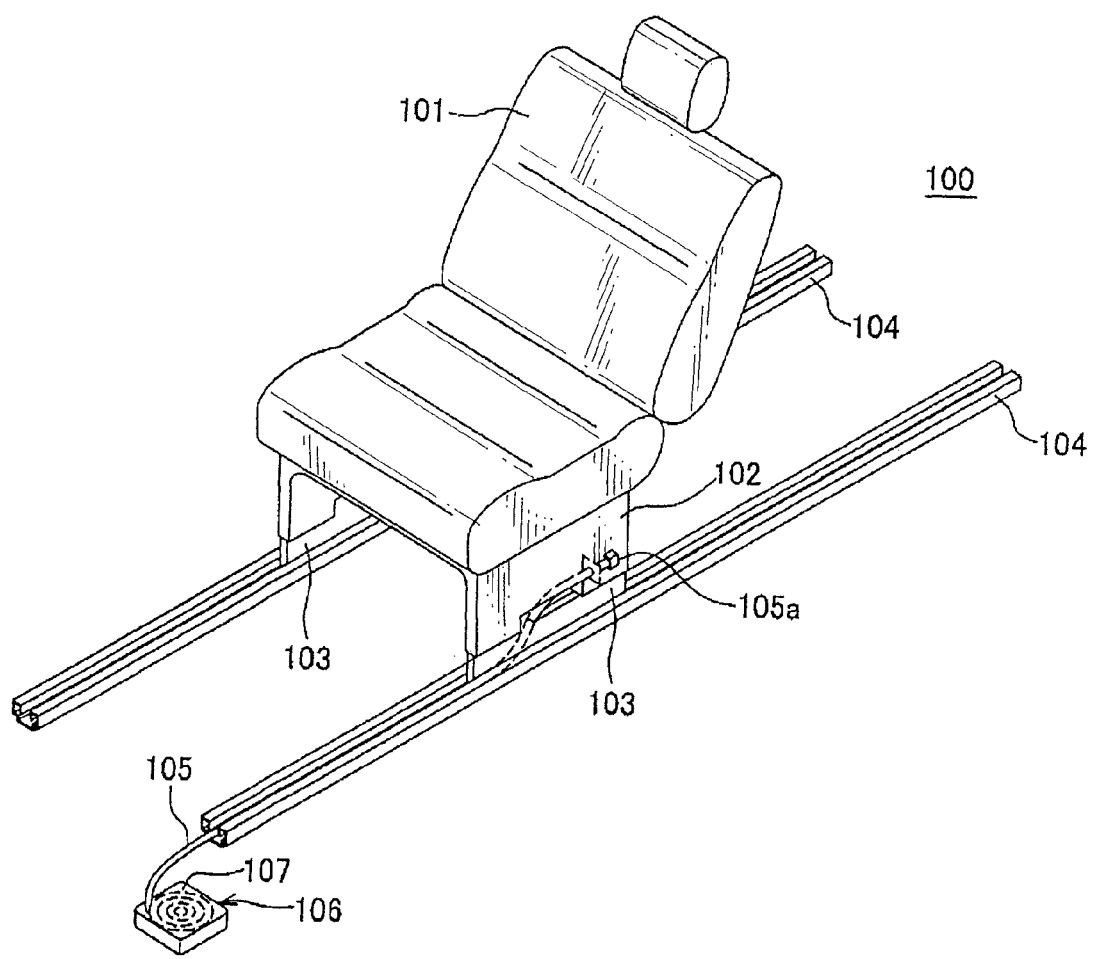
FIG. 13 is a perspective view of a wiring harness guiding apparatus by prior art.
Figure 14A:
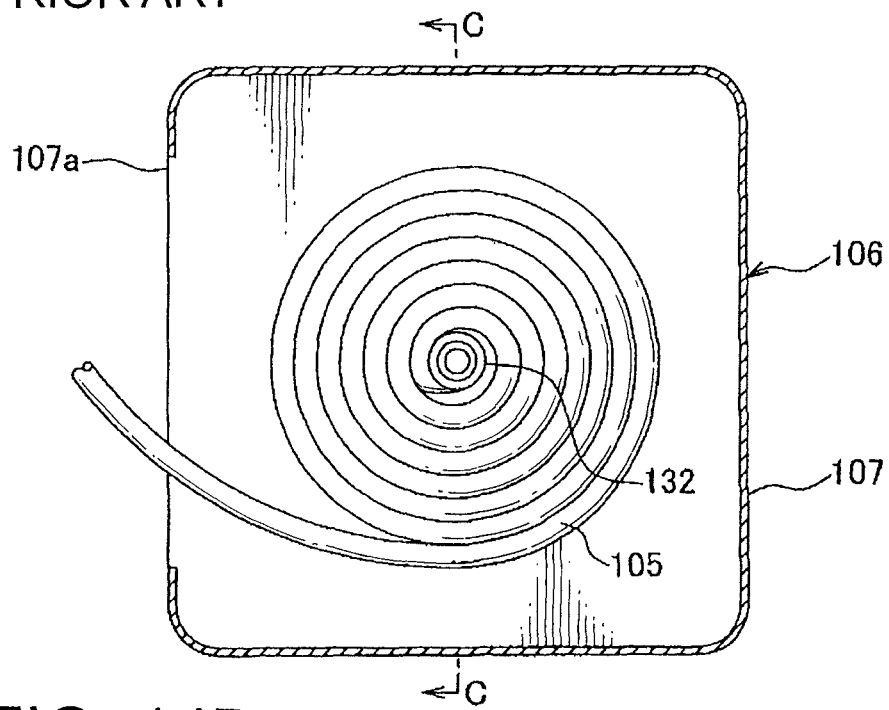
FIG. 14A is a cross-sectional view showing an inside of a housing of a winding device of the wiring harness guiding apparatus shown in FIG. 13.
Figure 14B:
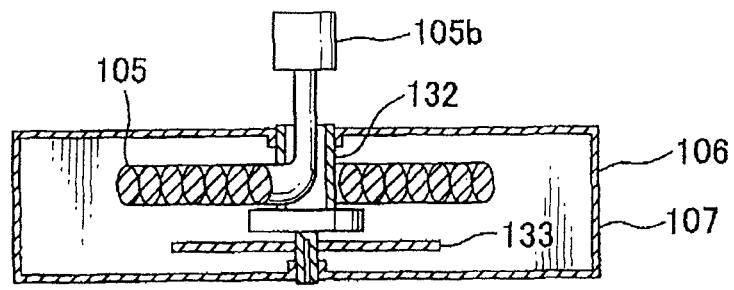
FIG. 14B is a cross-sectional view taken along the line C-C shown in FIG. 14A.

Thus, according to the present invention, the excess portion receiving section 3 is structured very simple, but can prevent looseness and tangle of the wiring harness 4. The excess portion receiving section 3 bends the excess portion of the wiring harness 4 and arranges it in the parallel section 30, so that comparing it with the prior art which receives the spirally wound wiring harness in a housing (see FIGS. 13 and 14), the length along the widthwise direction of the parallel section 30 can be made smaller than the length of side of the housing. The length along the lengthwise direction of the parallel section 30 can be made smaller than a slide span of the protector 8A. Thus, the wiring harness guiding apparatus 1A can be structured compact and simple. In the present invention, the parallel section 30 and the connecting section 31 can be formed integrally.

In the wiring harness guiding apparatus 1A mentioned above, when the seat and the support body 7A move from the one end 2a toward the other end 2b of the rail 2, the protector 8A is moved interlockingly with the seat and the support body 7A, and the wiring harness 4 is led out from the excess portion receiving section 3 and led into the space 28 of the rail 2. When the seat and the support body 7A move from the other end 2b toward the one end 2a of the rail 2, the protector 8A is moved interlockingly with the seat and the support body 7A, and the wiring harness 4 is led out from the space 28 of the rail 2 and led into the excess portion receiving section 3.

Second Embodiment the wiring harness guiding apparatus of a second embodiment according to the present invention will be described with reference to FIGS. 8-12. In FIGS. 4-12, the same components as the first embodiment are putted with the same remarks and descriptions for them are omitted.

Figure 8:
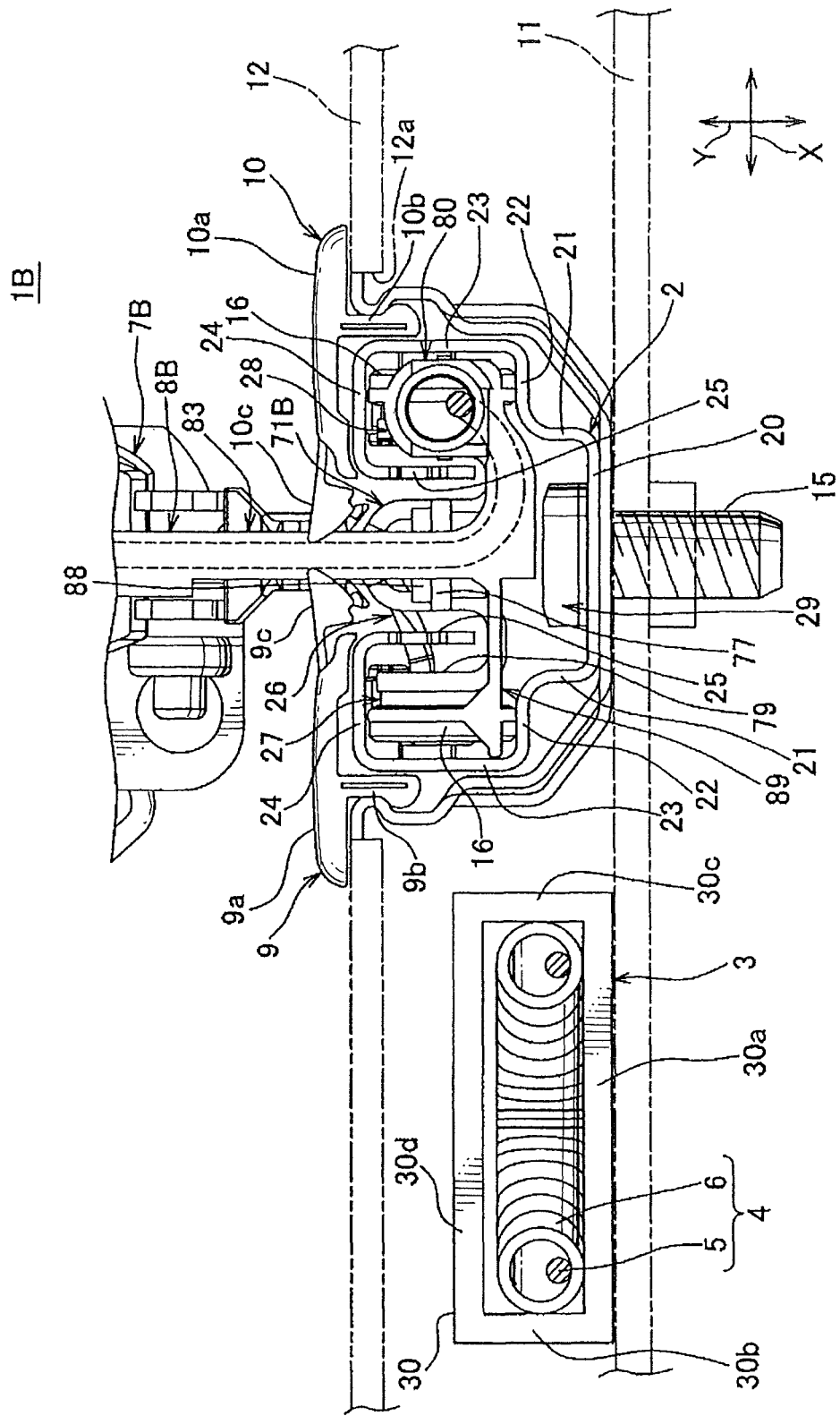
FIG. 8 is a perspective view of a wiring harness guiding apparatus of the second embodiment according to the present invention.

The wiring harness guiding apparatus 1B according to the embodiment includes a support body 7B supporting the seat, a protector 8B guiding the wiring harness 4 to the above-mentioned seat, the above-mentioned rail 2, the pair of moles 9, 10 and the excess portion receiving section 3, as shown in FIG. 8. The excess portion receiving section 3 is structured by the same components as the first embodiment, so that the description for it is omitted.

Figure 11:
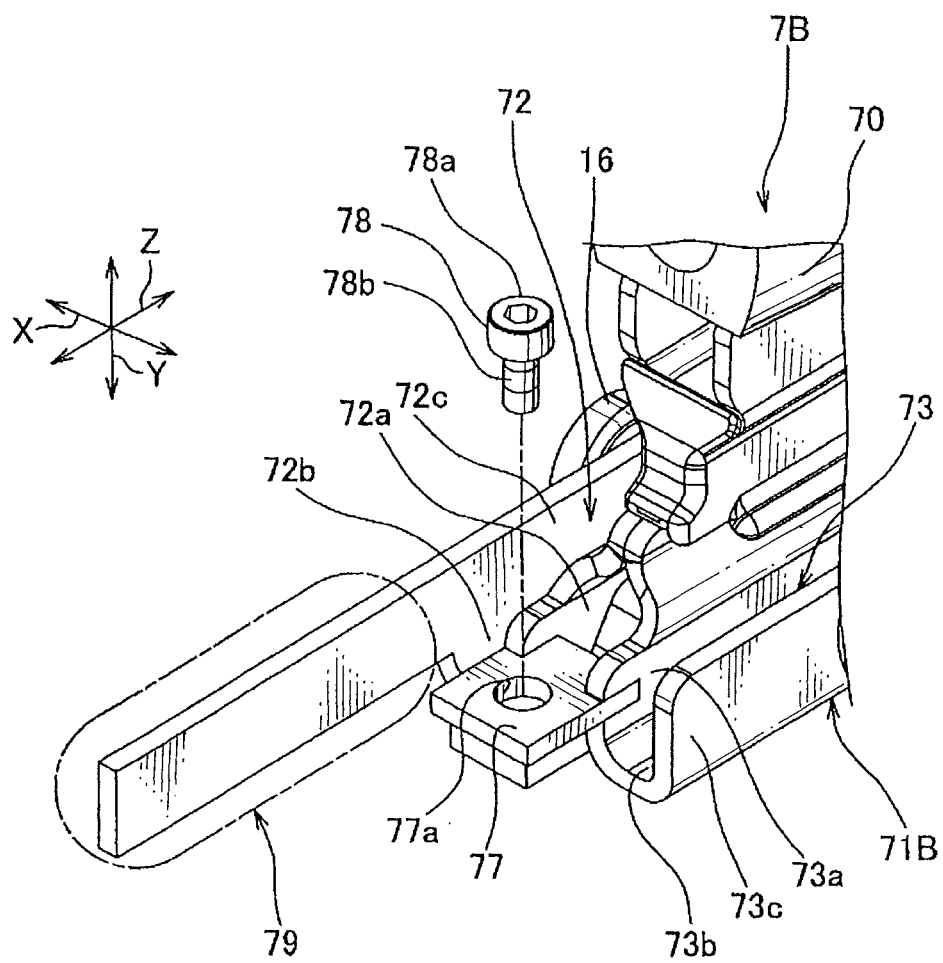
FIG. 11 is a perspective view of the support body shown in FIG. 10.

As shown in FIG. 11, the support body 7B includes a seat mount member 70, a slide member 71B, a mounted member 78 on which a later-described support body mount member 88 of a protector 8B is mounted, and the stopper 79.

The slide member 71B includes a first slide portion 72, a second slide portion 73, a plate 77 welded to ends of the first slide portion 72 and the second slide portion 73 at a side of the one end 2a of the rail 2. The plate member 77 is formed into a plate shape having a screw hole 77a screwed with the later-described mounted member 78. The plate member 77 is located at a position which the plate member 77 overlaps with the slit 26 of the rail 2 along the arrow Y direction.

Figure 9:
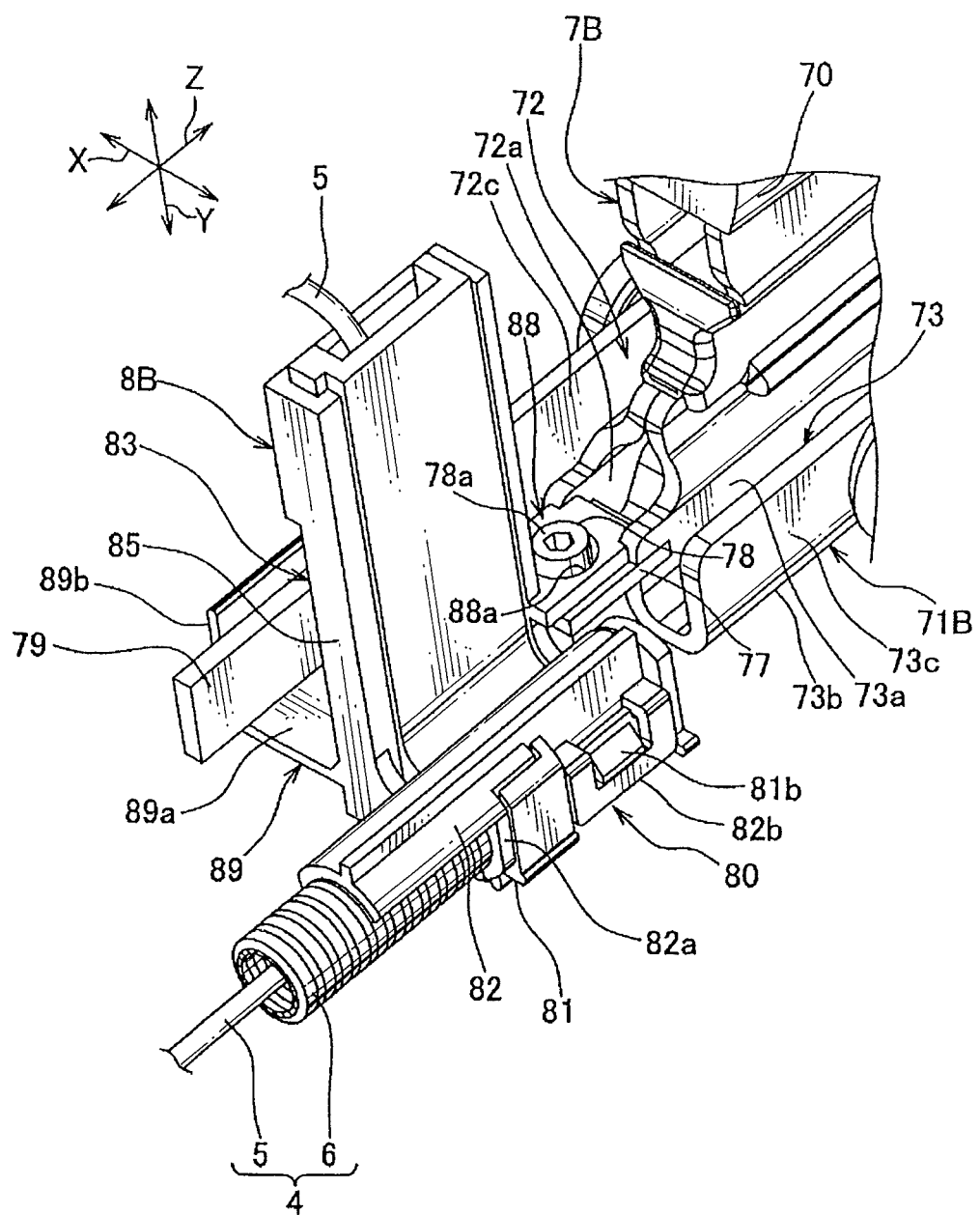
FIG. 9 is a perspective view of a support body and a protector of the wiring harness guiding apparatus shown in FIG. 8.

The mounted member 78 is formed into a bolt shape having a head portion 78a and a shaft portion 78b. The mount member 78 is mounted at the plate member 77 by screwing the shaft portion 78b into the screw hole 77a of the plate member 77. As shown in FIG. 9, about the mounted member 78 mounted at the plate member 77, the head portion 78a projects along the height direction of the rail 2 (the arrow Y direction).

The stopper 79 is formed into a plate shape extending from an end at the one end 2a of the rail 2 of the outer side plate 72c of the first slide portion 72 along the lengthwise direction of the first slide portion 72 (the arrow Z direction), as shown in FIG. 9. The stopper 79 abuts on the connecting section 31 of the excess portion receiving section 3 so as to stop sliding motion of the slide member 71B when the slide member 71B is sliding toward the one end 2a in the rail 2. The stopper 79 is formed so as to project more than the protector 8B farther from the slide member 71B. Thereby, when the slide member 71B slides toward the one end 2a in the rail 2, it is prevented that the protector 8B hits the connecting section 31 of the excess portion receiving section 3.

The protector 8B is formed by assembling two synthetic resin components, and includes a wiring harness fixing member 80, the lead-out member 83, the support body mount member 88 mounted at the mounted member 78 of the support body 7B movably in the widthwise direction on the rail 2 by having a clearance, and a rail contact member 89, as shown in FIGS. 8-10 and 12.

The support body mount member 88 extends into a plate shape from an outer surface of the second lead-out member 85, and includes a hole 88a in which the head 78a of the mounted member 78 is arranged. A length of the hole 88a along the widthwise direction of the rail 2 and a length of the hole 88a along the lengthwise direction of the rail 2 are formed larger than a length of the head 78a of the mounted member 78 along the widthwise direction of the rail 2 and a length of the head 78a along the lengthwise direction of the rail 2. By engaging the support body mount member 88 with the head 78a of the mounted member 78, the protector 8B is mounted at the support body 7B movably along the widthwise direction and height direction of the rail 2.

The support body mount member 88 is located at a position which the support body mount member 88 overlaps with the slit 26 of the rail 2 along the arrow Y direction. When such support body mount member 88 is engaged with the head 78a of the mounted member 78, the head 78a of the mounted member 78 mounted at the plate member 77 may be drawn out from the rail 2 and engaged with the support body mount member 88. Instead, by overlapping the support body mount member 88 of the protector 8B on the plate member 77, on which the mounted member 78 is not mounted yet, of the support body 7B positioned in the rail 2, and inserting the mounted member 78 from an outside of the slit 26 into the rail 2, and passing the head 78a of the mounted member 78 through the hole 88a of the support body mount member 88, the shaft 78b may be screwed into the screw hole 77a of the plate member 77.

Thus, according to the present invention, the support body mount member 88 is located at a position which the support body mount member 88 overlaps with the slit 26 of the rail 2 along the arrow Y direction, and the mounted member 78 is arranged removably at the support body 7B. Thereby, the support body mount member 88 can be mounted easily at the mounted member 78 without drawing the support body 7B from the rail 2.

Figure 10:
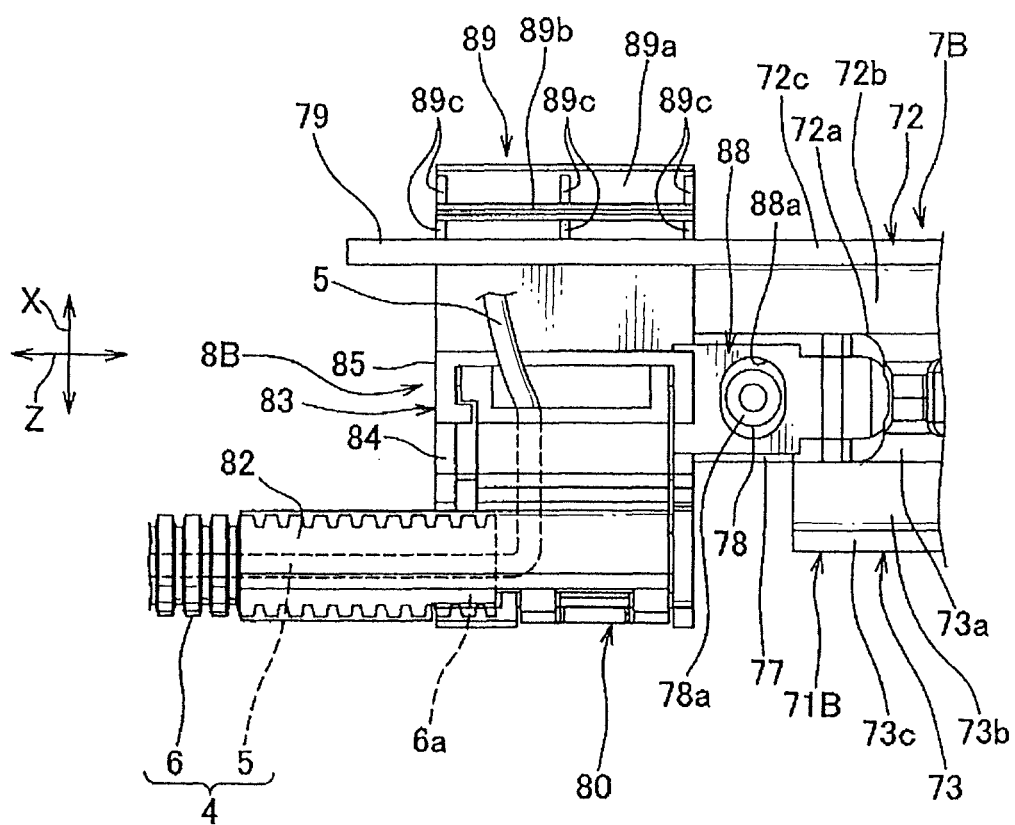
FIG. 10 is a plan view of the support body and the protector shown in FIG. 9.
Figure 12:
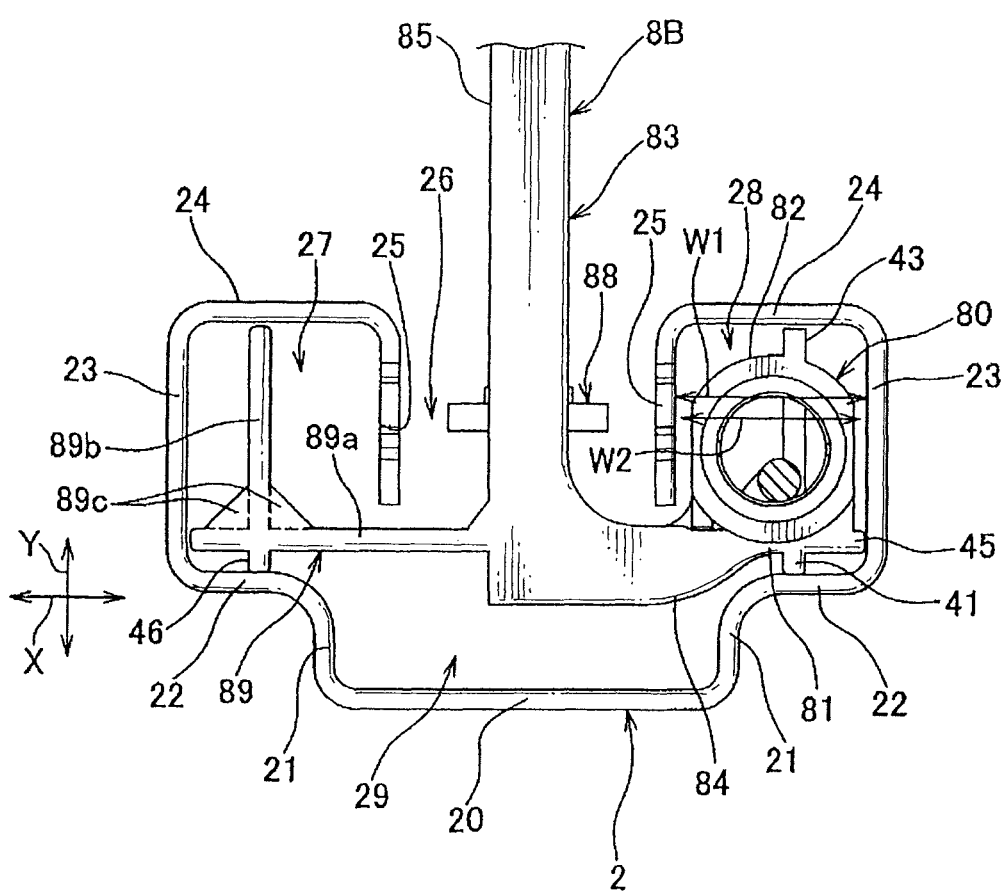
FIG. 12 is an expanded view of main area of the rail and the protector shown in FIG. 8.

The rail contact member 89 extends into a plate shape from the outer surface of the second lead-out member 85 along the widthwise direction of the rail 2 farther from the wiring harness fixing member 80, as shown in FIGS. 10 and 12, so as to be received in the space 27 of the rail 2. The rail contact member 89 includes a first rail contact portion 89a contacting with an inner surface of the one of the second side walls 23 of the rail 2, which forms the space 27; a second rail contact portion 89b contacting with an inner surface of one of top walls 24 of the rail 2, which forms the space 27; and a plurality of reinforcing portions 89c improving stiffness of the second rail contact portion 89b.

According to the present invention, by the rail contact member 89, the protector 8B is prevented from tilting toward the space 27 of the rail 2, and from rotating around the support body mount member 88, so that the protector 8B can slide smoothly. According to the present invention, when at least first rail contact portion 89a is provided at the rail contact member 89, the protector 8B can be prevented from tilting toward the space 27 of the rail 2. According to the present invention, it is not necessarily required that the first rail contact portion 89a and the second rail contact portion 89b are formed into a plate shape. However, the first rail contact portion 89a and the second rail contact portion 89b are formed into a plate shape, and thereby, contact area between the inner surface of the rail 2 and themselves can be reduced, and friction forces generated between the first rail contact portion 89a, the second rail contact portion 89b and the inner surface of the rail 2 can be reduced. Therefore, the protector 8B can slide smoothly.

Furthermore, the ribs 41, 43, 45, 46 which extend along the lengthwise direction of the rail 2 so as to slide on the inner surface of the rail 2, are provided on the outer surface of the wiring harness fixing member 80 and the bottom surface of the first rail contact portion 89a as shown in FIGS. 9 and 12. According to the present invention, by providing the ribs 41, 43, 45 and 46, the friction force which is generated between the wiring harness fixing member 80, the first rail contact portion 89a and the inner wall of the rail 2 when the protector 8B is sliding, can be reduced, so that the protector 8B can slide smoothly.

The mounted member 74, 78 described in the first and second embodiments may have height enough to prevent the support body mount member 87, 88 from falling off.

The present inventions are described based in the embodiments as mentioned above, but the present invention is not limited in above embodiments. Various change and modifications can be made with the scope of the present invention.

REMARKS 1A, 1B Wiring harness guiding apparatus
2 Rail
3 Excess portion receiving section
4 Wiring harness
7A, 7B Support body
8A, 8B Protector
11 Floor (car body)
26 Slit
74, 78 Mounted member
80 Wiring harness fixing member
83 Lead-out member
87, 88 Support body mount member

The invention claimed is:

1. A wiring harness guiding apparatus guiding a wiring harness between a car body and a slide body supported by a support body arranged slidably at a long-pipe-shaped rail fixed at the car body, comprising:
  a protector having
  a wiring harness fixing member fixing the wiring harness led from an opening arranged at one end along a lengthwise direction of the rail into the rail;
  a lead-out member extending with a pipe shape from the wiring harness fixing member so as to pass through a slit arranged between one end and the other end of the rail provided along a lengthwise direction of the rail to an outside of the rail, and leading the wiring harness therethrough toward the slide body; and
  a support body mount member extending from one end of the wiring harness fixing member in a longitudinal direction of the rail and being in engagement with a mounted member of the support body,
  wherein the support body mount member is superposed on the mounted member in a height direction of the rail and engages with the mounted member with a clearance such that the protector is movably coupled to the support body in a widthwise direction of the rail and in the height direction of the rail, and wherein the clearance is defined by a difference between a length of a portion of the support body mount member in engagement with the mounted member along the widthwise direction of the rail and a length of the mounted member along the widthwise direction of the rail.

2. The wiring harness guiding apparatus according to claim 1, wherein the support body mount member is provided with a hole which locates the mounted member projecting in a height direction of the rail inside the hole; and a length of the hole along the widthwise direction of the rail is formed larger than a length of the mounted member along the widthwise direction of the rail; and the protector is mounted at the support body movably in the widthwise direction and the height direction of the rail by engaging the support body mount member with the mounted member.

3. The wiring harness guiding apparatus according to claim 2, wherein the support body mount member is arranged on an extension line of a center axis of the wiring harness mounted at the wiring harness fixing member.

4. The wiring harness guiding apparatus according to claim 3, wherein the wiring harness mount member is located at a position which the wiring harness has a displacement along the widthwise direction of the rail from the slit opening at a top of the rail; and the lead-out member includes a first lead-out member extending with a pipe shape along a widthwise direction of the rail from the wiring harness mount member and a second lead-out member extending with a pipe shape along a height direction of the rail from the first lead-out member so as to pass through the slit to the outside of the rail and be formed into an L-shape pipe.

5. The wiring harness guiding apparatus according to claim 4, wherein the protector is provided with a support body overlap member extending from an outer surface of the second lead-out member along a widthwise direction of the rail so as to part from the wiring harness mount member and overlapping on the support body.

6. The wiring harness guiding apparatus according to claim 4, further comprising:
an excess portion receiving section including
a parallel portion receiving an excess portion of the wiring harness, which is led out from the opening to the outside of the rail and formed into U shape; and
a connecting section guiding the excess length of the wiring harness, which is led from the opening to the outside of the rail, toward the parallel portion.

7. The wiring harness guiding apparatus according to claim 2, wherein the wiring harness mount member is located at a position which the wiring harness has a displacement along the widthwise direction of the rail from the slit opening at a top of the rail; and the lead-out member includes a first lead-out member extending with a pipe shape along a widthwise direction of the rail from the wiring harness mount member and a second lead-out member extending with a pipe shape along a height direction of the rail from the first lead-out member so as to pass through the slit to the outside of the rail and be formed into an L-shape pipe.

8. The wiring harness guiding apparatus according to claim 7, wherein the protector is provided with a support body overlap member extending from an outer surface of the second lead-out member along a widthwise direction of the rail so as to part from the wiring harness mount member and overlapping on the support body.

9. The wiring harness guiding apparatus according to claim 8, further comprising:
an excess portion receiving section including
a parallel portion receiving an excess portion of the wiring harness, which is led out from the opening to the outside of the rail and formed into U shape; and
a connecting section guiding the excess length of the wiring harness, which is led from the opening to the outside of the rail, toward the parallel portion.

10. The wiring harness guiding apparatus according to claim 2, further comprising:
an excess portion receiving section including
a parallel portion receiving an excess portion of the wiring harness, which is led out from the opening to the outside of the rail and formed into U shape; and
a connecting section guiding the excess length of the wiring harness, which is led from the opening to the outside of the rail, toward the parallel portion.

11. The wiring harness guiding apparatus according to claim 7, further comprising:
an excess portion receiving section including
a parallel portion receiving an excess portion of the wiring harness, which is led out from the opening to the outside of the rail and formed into U shape; and
a connecting section guiding the excess length of the wiring harness, which is led from the opening to the outside of the rail, toward the parallel portion.

12. The wiring harness guiding apparatus according to claim 1, wherein the support body mount member is arranged on an extension line of a center axis of the wiring harness mounted at the wiring harness fixing member.

13. The wiring harness guiding apparatus according to claim 12, wherein the wiring harness mount member is located at a position which the wiring harness has a displacement along the widthwise direction of the rail from the slit opening at a top of the rail; and the lead-out member includes a first lead-out member extending with a pipe shape along a widthwise direction of the rail from the wiring harness mount member and a second lead-out member extending with a pipe shape along a height direction of the rail from the first lead-out member so as to pass through the slit to the outside of the rail and be formed into an L-shape pipe.

14. The wiring harness guiding apparatus according to claim 13, wherein the protector is provided with a support body overlap member extending from an outer surface of the second lead-out member along a widthwise direction of the rail so as to part from the wiring harness mount member and overlapping on the support body.

15. The wiring harness guiding apparatus according to claim 13, further comprising:
an excess portion receiving section including
a parallel portion receiving an excess portion of the wiring harness, which is led out from the opening to the outside of the rail and formed into U shape; and
a connecting section guiding the excess length of the wiring harness, which is led from the opening to the outside of the rail, toward the parallel portion.

16. The wiring harness guiding apparatus according to claim 1, wherein a wiring harness mount member is located at a position which the wiring harness has a displacement along the widthwise direction of the rail from the slit opening at a top of the rail; and the lead-out member includes a first lead-out member extending with a pipe shape along a widthwise direction of the rail from the wiring harness mount member and a second lead-out member extending with a pipe shape along a height direction of the rail from the first lead-out member so as to pass through the slit to the outside of the rail and be formed into an L-shape pipe.

17. The wiring harness guiding apparatus according to claim 16, wherein the protector is provided with a support body overlap member extending from an outer surface of the second lead-out member along a widthwise direction of the rail so as to part from the wiring harness mount member and overlapping on the support body.

18. The wiring harness guiding apparatus according to claim 16, further comprising:
   an excess portion receiving section including
      a parallel portion receiving an excess portion of the wiring harness, which is led out from the opening to the outside of the rail and formed into U shape; and
      a connecting section guiding the excess length of the wiring harness, which is led from the opening to the outside of the rail, toward the parallel portion.

19. The wiring harness guiding apparatus according to claim 17, further comprising:
   an excess portion receiving section including
      a parallel portion receiving an excess portion of the wiring harness, which is led out from the opening to the outside of the rail and formed into U shape; and
      a connecting section guiding the excess length of the wiring harness, which is led from the opening to the outside of the rail, toward the parallel portion.

20. The wiring harness guiding apparatus according to claim 1, further comprising:
   an excess portion receiving section including
      a parallel portion receiving an excess portion of the wiring harness, which is led out from the opening to the outside of the rail and formed into U shape; and
      a connecting section guiding the excess length of the wiring harness, which is led from the opening to the outside of the rail, toward the parallel portion.

* * * * *